(12) United States Patent
Lee

(10) Patent No.: US 9,602,901 B2
(45) Date of Patent: Mar. 21, 2017

(54) MAGNETIC LEVITATION AUDIO DEVICE

(71) Applicant: ATAKE DIGITAL TECHNOLOGY (SHENZHEN) CO., LTD., Shenzhen, Guangdong Province (CN)

(72) Inventor: Kuo Tsai Lee, Shenzhen (CN)

(73) Assignee: ATAKE DIGITAL TECHNOLOGY (SHENZHEN) CO., LTD., Shenzhen, Guangdong Province (CN)

( * ) Notice: Subject to any disclaimer, the term of this patent is extended or adjusted under 35 U.S.C. 154(b) by 197 days.

(21) Appl. No.: 14/443,071

(22) PCT Filed: Sep. 10, 2014

(86) PCT No.: PCT/CN2014/086225
§ 371 (c)(1),
(2) Date: May 14, 2015

(87) PCT Pub. No.: WO2015/109856
PCT Pub. Date: Jul. 30, 2015

(65) Prior Publication Data
US 2016/0150304 A1    May 26, 2016

(30) Foreign Application Priority Data

Jan. 20, 2014    (CN) .................. 2014 2 0040442 U

(51) Int. Cl.
*H02K 7/09*    (2006.01)
*H04R 1/02*    (2006.01)
(Continued)

(52) U.S. Cl.
CPC ............. *H04R 1/026* (2013.01); *H02K 7/09* (2013.01); *H02N 15/00* (2013.01); *H04R 1/323* (2013.01);
(Continued)

(58) Field of Classification Search
CPC .......... H02K 7/09; H04R 1/026; H04R 1/323; H04R 29/008; H04R 31/006; H02N 15/00
(Continued)

(56) References Cited

U.S. PATENT DOCUMENTS

| 4,860,370 A * | 8/1989 | Grosbard ............... H04R 3/002 381/403 |
| 2002/0057821 A1* | 5/2002 | Tsumori ................. H04R 9/025 381/412 |
| 2011/0074237 A1* | 3/2011 | Smoot .................... H02N 15/00 310/90.5 |

FOREIGN PATENT DOCUMENTS

| CN | 202696829 U | 1/2013 |
| CN | 203167227 U | 8/2013 |

(Continued)

OTHER PUBLICATIONS

Machine Translation, LI , CN203167227, Aug. 28, 2013.*

Primary Examiner — Thomas Truong
(74) Attorney, Agent, or Firm — Cheng-Ju Chiang

(57) ABSTRACT

A magnetic levitation audio device is disclosed. The magnetic levitation audio device comprises a magnetic levitation base capable of generating a magnetic field and a sound box levitated above the magnetic levitation base through a magnetic force. The magnetic levitation base comprises a base enclosure, an electromagnetic induction module disposed in the base enclosure, a PCB board and position indicator lamps, with the electromagnetic induction module and the position indicator lamps being electrically connected with the PCB board respectively; and the sound box comprises an enclosure, a magnet assembly disposed in the enclosure, a power supply module, an audio module, and a switch unit capable of sensing an instantaneous air flow. The present disclosure can control the sound box 20 to switch on without the need of manual operations, and this helps to (Continued)

improve the practicability of the magnetic levitation audio device.

20 Claims, 4 Drawing Sheets

(51) Int. Cl.
    *H04R 29/00*     (2006.01)
    *H02N 15/00*     (2006.01)
    *H04R 1/32*     (2006.01)
    *H04R 31/00*     (2006.01)

(52) U.S. Cl.
    CPC ......... *H04R 29/008* (2013.01); *H04R 31/006* (2013.01); *H04R 2420/07* (2013.01)

(58) Field of Classification Search
    USPC ....................................................... 310/90.5
    IPC ....................................................... H02K 7/09
    See application file for complete search history.

(56)     References Cited

FOREIGN PATENT DOCUMENTS

| | | |
|---|---|---|
| CN | 203708420 U | 7/2014 |
| JP | 2009-182846 A | 8/2009 |

\* cited by examiner

MAGNETIC LEVITATION AUDIO DEVICE

CROSS REFERENCE TO RELATED APPLICATIONS

The present application is a 35 U.S.C. §371 National Phase conversion of International (PCT) Patent Application No. PCT/CN2014/086225, filed on Sep. 10, 2014, which claims the benefit of Chinese Application No. 201420040442.4, filed on Jan. 22, 2014, the disclosure of which is incorporated by reference herein. The PCT International Patent Application was filed in Chinese.

FIELD OF THE INVENTION

The present disclosure generally relates to the technical field of audio devices, and more particularly, to a magnetic levitation audio device.

BACKGROUND OF THE INVENTION

As a terminal of an audio system, a sound box is adapted to transform audio electric energy into corresponding sound energy and radiate the sound energy into the space.

A magnetic levitation player of the prior art utilizes a base to generate a magnetic field so that the player is levitated in the air under the action of a magnetic force; and moreover, the player utilizes a magnetic field sensor and an LED for initial positioning. However, buttons of the magnetic levitation player (such as a switch button) are all disposed on the player, so the sound box tends to be displaced when a user operates the buttons on the player, and the audio device may fall off the base if the force applied thereto by the user is too large.

Additionally, although the audio device utilizes the magnetic field sensor and the LED for initial positioning, operational errors are inevitable because the positioning is done manually, and this makes the positioning operation troublesome.

SUMMARY OF THE INVENTION

A primary objective of the present disclosure is to provide a magnetic levitation audio device so as to control a sound box to switch on or switch off without the need of manual operation and to improve the practicability of the magnetic levitation audio device.

To achieve the aforesaid objective, the present disclosure provides a magnetic levitation audio device. The magnetic levitation audio device comprises a magnetic levitation base capable of generating a magnetic field and a sound box levitated above the magnetic levitation base through a magnetic force. The magnetic levitation base comprises a base enclosure, an electromagnetic induction module disposed in the base enclosure, a printed circuit board (PCB) board and position indicator lamps, with the electromagnetic induction module and the position indicator lamps being electrically connected with the PCB board respectively; and the sound box comprises an enclosure, a magnet assembly disposed in the enclosure, a power supply module, an audio module, and a switch unit capable of sensing an instantaneous air flow, the switch unit has a terminal electrically connected with the power supply module and the other terminal electrically connected with the audio module, and the switch unit is adapted to control the power supply module to output/disconnect the power to the audio module when an instantaneous air flow is sensed.

Preferably, the number of the position indicator lamps is four, and the four position indicator lamps are distributed evenly around the electromagnetic induction module.

Preferably, the switch unit comprises a blow sensing probe for sensing a strength of the instantaneous air flow, an environment sensing probe for monitoring the strength of an ambient air flow in real time and for acquiring an air force level of the ambient air flow around the sound box when the instantaneous air flow is sensed by the blow sensing probe, a control chip for comparing the air force level sensed by the blow sensing probe with the air force level acquired by the environment sensing probe and outputting a high-level signal when the air force level sensed by the blow sensing probe is greater than the air force level acquired by the environment sensing probe, and a control switch that switches on or off according to the high-level signal outputted by the control chip, the control switch has a terminal connected with a power output terminal of the power supply module and the other terminal connected with a power input terminal of the audio module, and the environment sensing probe and the blow sensing probe are electrically connected with the control chip respectively and are spaced apart by a predetermined distance.

Preferably, the blow sensing probe is disposed in the enclosure and directly faces towards a central position of an upper end surface of the enclosure, and a through slot or a through hole extending through the enclosure is formed at the position on the upper end surface of the enclosure that corresponds to the blow sensing probe. Preferably, a foot pad is disposed on the enclosure at a side corresponding to the magnetic levitation base.

Preferably, the sound box is in the form of a flying saucer or an oblate spheroid.

Preferably, the magnetic levitation base is in the form of a disk.

Preferably, the magnetic levitation audio device further comprises a positioning device, wherein the positioning device is provided with an opening for horizontally placing the sound box at a side corresponding to the bottom of the sound box and is provided with at least one positioning boss at a side corresponding to the magnetic levitation base, and a positioning slot for receiving the boss is disposed on the upper end surface of the magnetic levitation base at a position corresponding to the positioning boss.

Preferably, the positioning device comprises a first positioning piece and a second positioning piece, the first positioning piece is provided with at least one groove at an end opposite to the second positioning piece, and the second positioning piece is provided with a boss that conformably mates with the groove at an end opposite to the first positioning piece and at a position corresponding to the groove; and the first positioning piece and the second positioning piece are each provided with the positioning boss.

Preferably, a bottom surface of the magnetic levitation base is provided with at least one suction cup, and a horn-shaped end of the suction cup is disposed away from the bottom surface of the magnetic levitation base.

The magnetic levitation audio device according to the present disclosure has a switch unit capable of sensing an instantaneous air flow disposed on the sound box of an existing magnetic levitation audio device, the switch unit has a terminal electrically connected with the power supply module and the other terminal electrically connected with the audio module, and the switch unit is adapted to control the power supply module to output/disconnect the power to the audio module when an instantaneous air flow is sensed.

Thus, the sound box can be controlled to switch on without the need of manual operations, and this improves the practicability of the magnetic levitation audio device.

Implementation of the objectives, functional features and advantages of the present disclosure will be further described in connection with the embodiments with reference to the attached drawings.

DETAILED DESCRIPTION OF THE INVENTION

Hereinbelow, the technical solutions of embodiments of the present disclosure will be described clearly and completely with reference to the attached drawings. Obviously, the embodiments described herein are only some of but not all of the embodiments of the present disclosure. All other embodiments that can be devised without making inventive efforts by those of ordinary skill in the art upon reviewing the embodiments of the present disclosure shall fall within the scope of the present disclosure.

Figure 1:
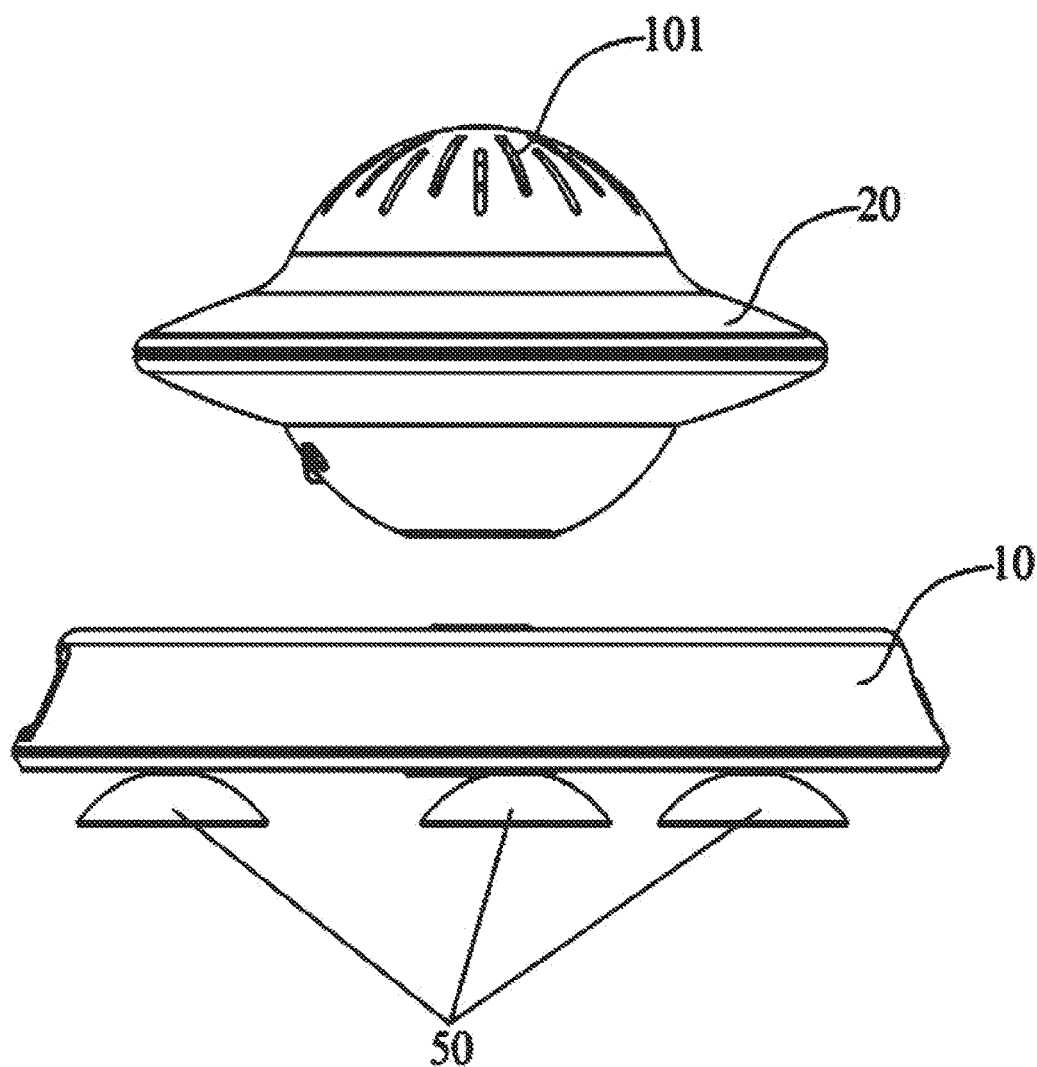
FIG. 1 is a schematic structural view of an embodiment of a magnetic levitation audio device according to the present disclosure.
Figure 2:
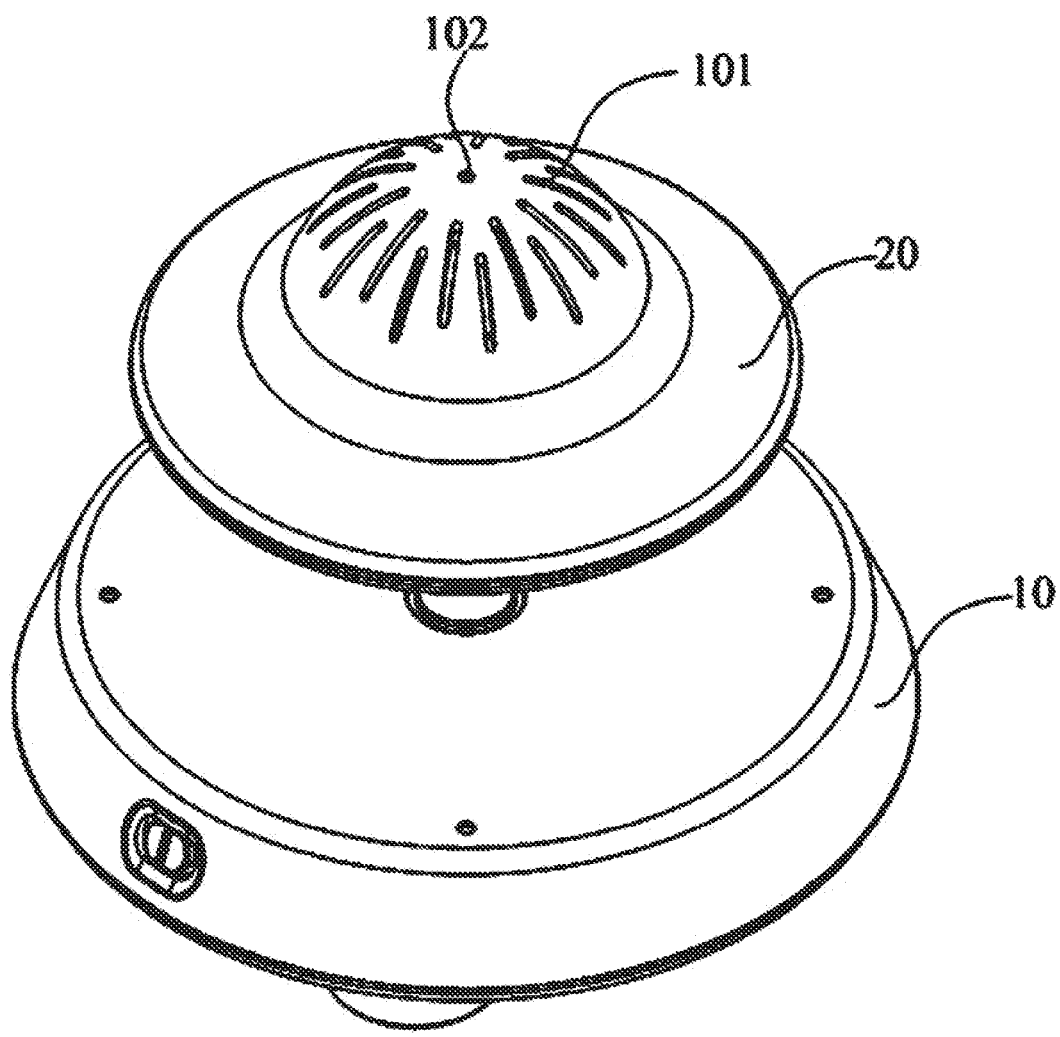
FIG. 2 is a schematic structural view of FIG. 1 observed from another angle.
Figure 3:
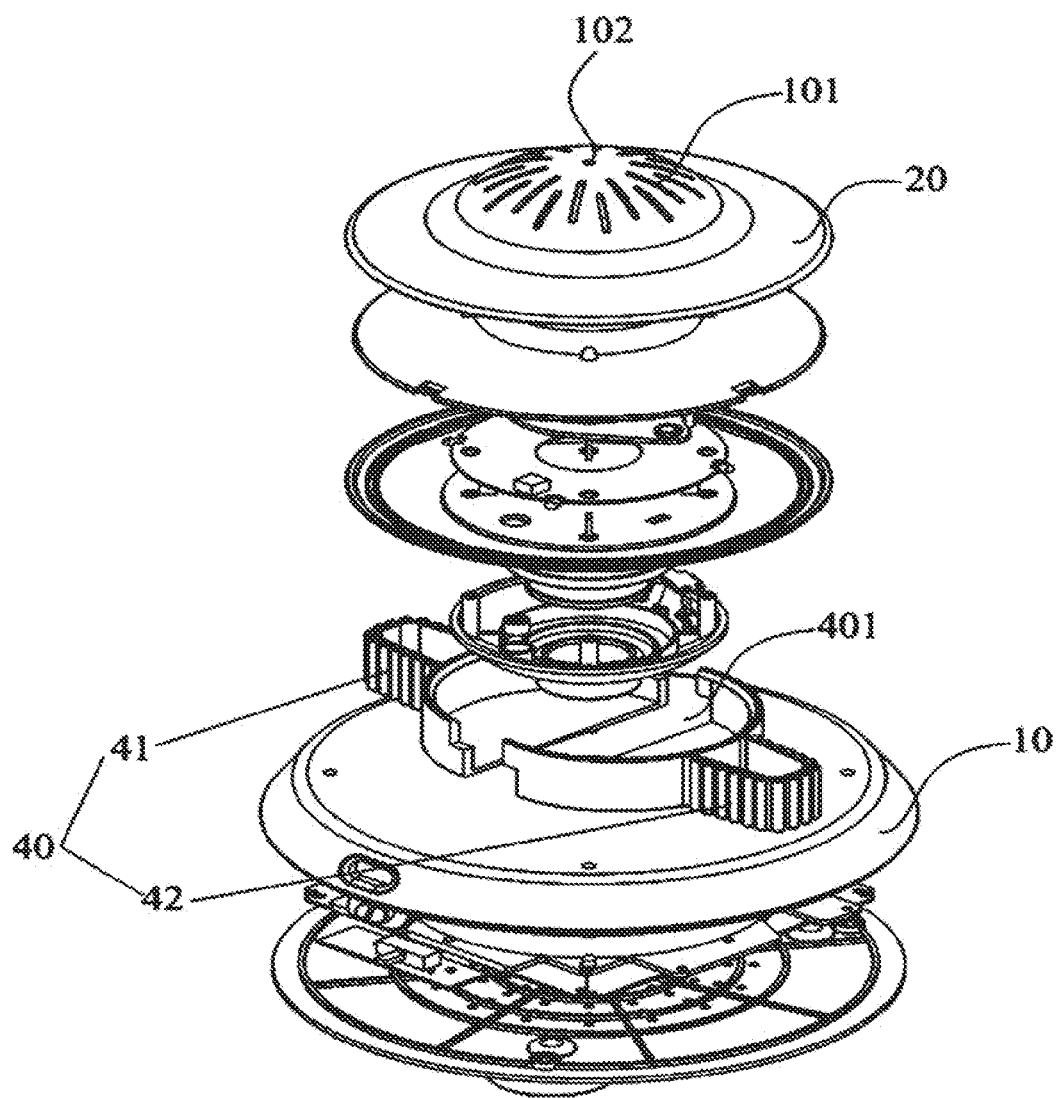
FIG. 3 is a schematic exploded structural view of an embodiment of the magnetic levitation audio device according to the present disclosure.
Figure 4:
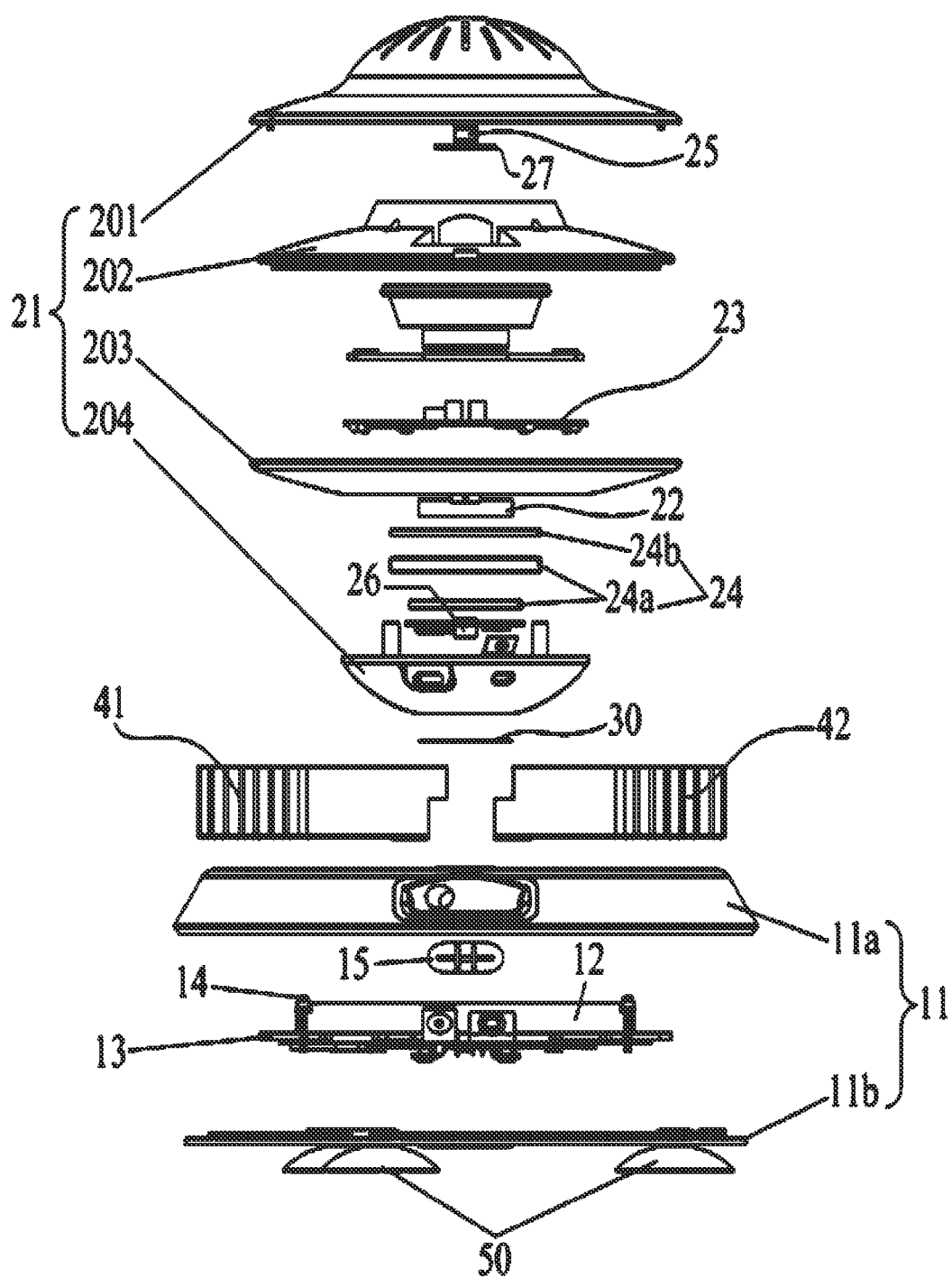
FIG. 4 is an exploded view of FIG. 3 observed from another angle.

Referring to FIG. 1 to FIG. 4 together, FIG. 1 is schematic structural view of an embodiment of a magnetic levitation audio device according to the present disclosure; FIG. 2 is a schematic structural view of FIG. 1 observed from another angle; FIG. 3 is a schematic exploded structural view of an embodiment of the magnetic levitation audio device according to the present disclosure; and FIG. 4 is an exploded view of FIG. 3 observed from another angle.

The present disclosure provides a magnetic levitation audio device that comprises a magnetic levitation base 10 capable of generating a magnetic field and a sound box 20 levitated above the magnetic levitation base 10 through a magnetic force.

The magnetic levitation base 10 mainly comprises a base enclosure 11, an electromagnetic induction module 12 disposed in the base enclosure 11, a printed circuit board (PCB) board 13 and position indicator lamps 14, with the electromagnetic induction module 12 and the position indicator lamps 14 being electrically connected with the PCB board 13 respectively. In this preferred embodiment, the magnetic levitation base 10 is in the form of a disc. Of course, in other embodiments, the magnetic levitation base 10 may also be of any other shape, e.g., a square, etc. The base enclosure 11 consists of an upper lid 11a and a lower lid 11b that mate with each other, and the upper lid 11a is preferably made of a semitransparent plastic material to facilitate positioning. Moreover, the upper lid 10a is further provided with a seesaw switch 15, and the seesaw switch 15 is electrically connected with the PCB board 13 so as to control the electromagnetic induction module 12 to be turned on or turned off via the PCB board 13. The electromagnetic induction module 12 is adapted to generate an electromagnetic field after being energized. The number of the position indicator lamps 14 is preferably four, and the four position indicator lamps 14 are distributed evenly around the electromagnetic induction module 12. After the electromagnetic induction module 12 is activated, the four position indicator lamps 14 are normally on so as to indicate the positioning between the sound box 20 and the magnetic levitation base 10.

The sound box 20 comprises an enclosure 21, a power supply module 22 disposed in the enclosure 21, an audio module 23, a magnet assembly 24, and a switch unit 25 capable of sensing an instantaneous air flow, the switch unit 25 has a terminal electrically connected with the power supply module 22 and the other terminal electrically connected with the audio module 23, and the switch unit 25 is adapted to control the power supply module 22 to output/disconnect the power to the audio module 23 when an instantaneous air flow is sensed. In this embodiment, the sound box 20 is the player part, and the shape thereof may be in various forms, e.g., a spheroid. In this preferred embodiment, the sound box 20 is in the form of a flying saucer or an oblate spheroid, and this allows for a better balance of the sound box 20 when it is magnetically levitated, 360° rotation of the sound box 20 while it is playing music, and a better 3D stereo surrounding sound effect. Furthermore, as shown in FIG. 1, the enclosure 21 mainly consists of an upper housing 201, an inner housing 202, a lower housing 203 and a rear housing 204 that are fixedly connected with each other in sequence to form the flying saucer shape or the oblate spheroid shape. The upper housing 201, the inner housing 202, the lower housing 203 and the rear housing 204 are each made of a semitransparent plastic material. Additionally, the sound box 20 may be provided with a Bluetooth module to establish a Bluetooth audio connection with an external audio apparatus (e.g., intelligent electronic products, such as a mobile phone, etc.) so as to play music. The audio module 23 comprises an audio player and the control circuit thereof. The magnet assembly 24 consists of two magnets 24a and an iron sheet 24b, and the two magnets 24a are all rounded, but one is larger and the other is smaller. The switch unit 25 is a blow control switch, and is adapted to automatically switch on after an instantaneous air flow is sensed so as to electrically connect the power supply module 22 with the audio module 23. Thus, the audio module 23 can electrically play music. It shall be appreciated that, the switch unit 25 switches on when a first instantaneous air flow is sensed and switches off when a next instantaneous air flow is sensed so that the sound box 20 can play music without the need of manual operation. In this way, the problem that the sound box 20 may be displaced or fall off the magnetic levitation base 10 due to a manual operation on the sound box 20 is avoided. The power supply module 22 is adapted to supply power to the audio module 23, and the power supply module 22 may be a storage battery.

Further, to improve accuracy of the control and to avoid maloperations, the switch unit 25 in the aforesaid embodiments comprises a control chip (not shown), a blow sensing probe (not shown), an environment sensing probe 26 and a control switch (not shown), with the blow sensing probe, the environment sensing probe 26 and the control switch being electrically connected with the control chip respectively. The control switch has a terminal electrically connected with the power supply module 22 and the other terminal electrically connected with the audio module 23. The environment sensing probe 26 and the blow sensing probe are positioned in a same environment and are spaced apart by a predetermined distance. The predetermined distance is set to ensure that the environment sensing probe 26 and the blow sensing probe are not within the coverage of a same air blow. Otherwise, when an air blow operation is performed on the blow sensing probe, the environment sensing probe 26 can also detect the air blow and thus the audio module 23 of the sound box cannot be activated. The blow sensing probe and/or the environment sensing probe 26 are preferably blow sensing probes.

Specifically, the blow sensing probe is adapted to sense a strength of the instantaneous air flow in real time and store the air force level of the sensed instantaneous air flow into the control chip.

The environment sensing probe 26 is adapted to monitor the strength of an ambient air flow in real time, acquire an air force level of the ambient air flow around the sound box when the instantaneous air flow is sensed by the blow sensing probe, and store the air force level into the control chip. The blow sensing probe and the environment sensing probe 26 are connected to and controlled by the control chip. Once the blow sensing probe has sensed the instantaneous air flow, the control chip may control the environment sensing probe 26 to detect the strength of the current environment air; or the environment sensing probe 26 detects and stores the strength of the ambient environment air in real time and compares the air force level sensed by the blow sensing probe with the air force level of the environment air acquired by the environment sensing probe 26 at the same time when the instantaneous air flow is sensed by the blow sensing probe. In this way, the blow sensing probe will not be influenced by the environment to cause maloperations, thereby improving accuracy of the control.

The control chip is adapted to compare the air force level sensed by the blow sensing probe with the air force level acquired by the environment sensing probe 26 and, when the air force level sensed by the blow sensing probe is greater than the air force level acquired by the environment sensing probe 26, send out an instruction for controlling the control switch to switch on or switch off. The control chip is the master control part of the sound box 20, and it may be further adapted to control the Bluetooth module therein to establish a Bluetooth audio connection with the external audio apparatus. The control chip may adopt a single chip microcomputer (SCM) for program compiling so as to achieve corresponding functions such as the controlling and comparing functions thereof.

Further, the blow sensing probe is disposed in the enclosure 21 and directly faces towards a central position of an upper end surface of the enclosure 21, and a through slot 101 or a through hole 102 extending through the enclosure 21 is formed at the position on the upper end surface of the enclosure 21 that corresponds to the blow sensing probe. Disposing the blow sensing probe in the enclosure 21 can prevent the blow sensing probe from being influenced by the external environment to cause maloperations.

Of course, for convenience of operation, an installation slot (not shown) extending through the enclosure 21 may be further formed on the enclosure 21, and the blow sensing probe is disposed in the installation slot. Further, for convenience of controlling the blow sensing probe, the installation slot is disposed on the enclosure 21 on the upper end surface of the sound box 20. Placing the blow sensing probe into the installation slot on the upper end surface of the sound box 20 makes it convenient to blow air to the blow sensing probe. Moreover, a lamp plate 27 is disposed in the enclosure 21 at a position corresponding to the blow sensing probe, and the lamp plate 27 has at least one indicator lamp disposed thereon. The indicator lamp is a light emitting diode (LED) lamp, and it can flash regularly when the sound box 20 is playing music.

Further, a foot pad 30 is disposed on a bottom surface of the sound box 20. The food pad 30 is made of an EVA material and is adapted to make it convenient for the sound box 20 to be placed on the magnetic levitation base 10 when it is not levitated, thereby avoiding damage to the sound box 20 due to direct contact with the magnetic levitation base 10.

Further, to levitate the sound box 20 conveniently and rapidly, the magnetic levitation audio device comprises also a positioning device 40. The positioning device 40 is provided with an opening 401 for horizontally placing the sound box 20 at a side corresponding to the bottom of the sound box 20 and is provided with at least one positioning boss (not shown) at a side corresponding to the magnetic levitation base 10, and a positioning slot (not shown) for receiving the boss is disposed on the upper end surface of the magnetic levitation base 10 at a position corresponding to the positioning boss. The height of the positioning device 40 is smaller than or equal to the levitation height of the sound box 20. When the sound box 20 needs to be levitated, a power switch on the magnetic levitation base 10 is turned on so that a magnetic field is generated by the magnetic levitation base 10, next the sound box 20 is placed on the opening 401 end of the positioning device 40, and then the positioning device 40 is placed at the levitation position of the sound box 20 of the magnetic levitation base 10 and the position of the positioning device 40 is limited by the positioning boss. In this case, the magnetic field generated by the magnetic levitation base 10 allows the sound box 20 to be levitated, thereby avoiding the problem that it is hard to levitate the sound box 20 through manual operations because the manual operations tend to cause imbalance and inclination of the sound box 20.

Further, to make it convenient to remove the positioning device 40 after the sound box 20 is levitated, the positioning device 40 comprises a first positioning piece 41 and a second positioning piece 42, the first positioning piece 41 is provided with at least one groove at an end opposite to the second positioning piece 42, and the second positioning piece 42 is provided with a boss that conformably mates with the groove at an end opposite to the first positioning piece 41 and at a position corresponding to the groove; and the first positioning piece 41 and the second positioning piece 42 are each provided with the positioning boss. Because the positioning device 40 is not disposed as a one-piece part, it can be removed, after the sound box 20 is levitated, simply by pulling the first positioning piece 41 and the second positioning piece 42 towards two sides without touching the sound box 20 during the operation.

Further, to place the magnetic levitation base 10 securely, a bottom surface of the magnetic levitation base 10 is provided with at least one suction cup 50, and a horn-shaped end of the suction cup 50 is disposed away from the bottom surface of the magnetic levitation base 10. The suction cup 50 enables the magnetic levitation base 10 to be securely sucked onto a horizontal fixed table or desk top.

The magnetic levitation audio device according to the present disclosure has a switch unit 25 capable of sensing an instantaneous air flow disposed on the sound box 20 of an existing magnetic levitation audio device, the switch unit 25 has a terminal electrically connected with the power supply module 22 and the other terminal electrically connected with the audio module 23, and the switch unit 25 is adapted to control the power supply module 22 to output/disconnect the power to the audio module 23 when an instantaneous air flow is sensed. Thus, the sound box 20 can be controlled to switch on without the need of manual operations, and this improves the practicability of the magnetic levitation audio device.

What is claimed is:

1. A magnetic levitation audio device, comprising a magnetic levitation base capable of generating a magnetic field and a sound box levitated above the magnetic levitation base through a magnetic force, wherein the magnetic levitation base comprises a base enclosure, an electromagnetic induction module disposed in the base enclosure, a printed circuit board (PCB) board and position indicator lamps, with the electromagnetic induction module and the position indicator lamps being electrically connected with the PCB board respectively; and the sound box comprises an enclosure, a magnet assembly disposed in the enclosure, a power supply module, an audio module, and a switch unit capable of sensing an instantaneous air flow, the switch unit has a terminal electrically connected with the power supply module and the other terminal electrically connected with the audio module, and the switch unit is adapted to control the power supply module to output/disconnect the power to the audio module when an instantaneous air flow is sensed.

2. The magnetic levitation audio device of claim 1, wherein the number of the position indicator lamps is four, and the four position indicator lamps are distributed evenly around the electromagnetic induction module.

3. The magnetic levitation audio device of claim 1, wherein the switch unit comprises a blow sensing probe for sensing a strength of the instantaneous air flow, an environment sensing probe for monitoring the strength of an ambient air flow in real time and for acquiring an air force level of the ambient air flow around the sound box when the instantaneous air flow is sensed by the blow sensing probe, a control chip for comparing the air force level sensed by the blow sensing probe with the air force level acquired by the environment sensing probe and outputting a high-level signal when the air force level sensed by the blow sensing probe is greater than the air force level acquired by the environment sensing probe, and a control switch that switches on or off according to the high-level signal outputted by the control chip, the control switch has a terminal connected with a power output terminal of the power supply module and the other terminal connected with a power input terminal of the audio module, and the environment sensing probe and the blow sensing probe are electrically connected with the control chip respectively and are spaced apart by a predetermined distance.

4. The magnetic levitation audio device of claim 3, wherein the blow sensing probe is disposed in the enclosure and directly faces towards a central position of an upper end surface of the enclosure, and a through slot or a through hole extending through the enclosure is formed at the position on the upper end surface of the enclosure that corresponds to the blow sensing probe.

5. The magnetic levitation audio device of claim 3, wherein a lamp plate is disposed in the enclosure at a position corresponding to the blow sensing probe, the lamp plate has at least one indicator lamp disposed thereon, and the indicator lamp is a light emitting diode (LED) lamp.

6. The magnetic levitation audio device of claim 5, wherein an installation slot extending through the enclosure is formed in the enclosure, and the blow sensing probe is disposed in the installation slot.

7. The magnetic levitation audio device of claim 1, wherein a foot pad is disposed on the enclosure at a side corresponding to the magnetic levitation base.

8. The magnetic levitation audio device of claim 1, wherein the sound box is in the form of a flying saucer or an oblate spheroid.

9. The magnetic levitation audio device of claim 1, wherein the magnetic levitation base is in the form of a disk.

10. The magnetic levitation audio device of claim 9, wherein a bottom surface of the magnetic levitation base is provided with at least one suction cup, and a horn-shaped end of the suction cup is disposed away from the bottom surface of the magnetic levitation base.

11. The magnetic levitation audio device of claim 10, further comprising a positioning device, wherein the positioning device is provided with an opening for horizontally placing the sound box at a side corresponding to the bottom of the sound box and is provided with at least one positioning boss at a side corresponding to the magnetic levitation base, and a positioning slot for receiving the boss is disposed on the upper end surface of the magnetic levitation base at a position corresponding to the positioning boss.

12. The magnetic levitation audio device of claim 11, wherein the positioning device comprises a first positioning piece and a second positioning piece, the first positioning piece is provided with at least one groove at an end opposite to the second positioning piece, and the second positioning piece is provided with a boss that conformably mates with the groove at an end opposite to the first positioning piece and at a position corresponding to the groove; and the first positioning piece and the second positioning piece are each provided with the positioning boss.

13. The magnetic levitation audio device of claim 1, further comprising a positioning device, wherein the positioning device is provided with an opening for horizontally placing the sound box at a side corresponding to the bottom of the sound box and is provided with at least one positioning boss at a side corresponding to the magnetic levitation base, and a positioning slot for receiving the boss is disposed on the upper end surface of the magnetic levitation base at a position corresponding to the positioning boss.

14. A magnetic levitation audio device, comprising a magnetic levitation base capable of generating a magnetic field and a sound box levitated above the magnetic levitation base through a magnetic force, wherein the magnetic levitation base comprises a base enclosure, an electromagnetic induction module disposed in the base enclosure, a printed circuit board (PCB) board and position indicator lamps, with the electromagnetic induction module and the position indicator lamps being electrically connected with the PCB board respectively; and the sound box comprises an enclosure, a magnet assembly disposed in the enclosure, a power supply module, an audio module, and a switch unit capable of sensing an instantaneous air flow, the switch unit has a terminal electrically connected with the power supply module and the other terminal electrically connected with the audio module, and the switch unit is adapted to control the power supply module to output/disconnect the power to the audio module when an instantaneous air flow is sensed; and wherein the magnetic levitation audio device further comprises a positioning device, the positioning device is provided with an opening for horizontally placing the sound box at a side corresponding to the bottom of the sound box and is provided with at least one positioning boss at a side corresponding to the magnetic levitation base, and a positioning slot for receiving the boss is disposed on the upper end surface of the magnetic levitation base at a position corresponding to the positioning boss.

15. The magnetic levitation audio device of claim 14, wherein the positioning device comprises a first positioning piece and a second positioning piece, the first positioning piece is provided with at least one groove at an end opposite to the second positioning piece, and the second positioning piece is provided with a boss that conformably mates with the groove at an end opposite to the first positioning piece and at a position corresponding to the groove; and the first positioning piece and the second positioning piece are each provided with the positioning boss.

16. The magnetic levitation audio device of claim 15, wherein a bottom surface of the magnetic levitation base is provided with at least one suction cup, and a horn-shaped end of the suction cup is disposed away from the bottom surface of the magnetic levitation base.

17. The magnetic levitation audio device of claim 14, wherein a foot pad is disposed on the enclosure at a side corresponding to the magnetic levitation base.

18. The magnetic levitation audio device of claim 14, wherein the sound box is in the form of a flying saucer or an oblate spheroid.

19. The magnetic levitation audio device of claim 14, wherein the magnetic levitation base is in the form of a disk.

20. The magnetic levitation audio device of claim 19, wherein a bottom surface of the magnetic levitation base is provided with at least one suction cup, and a horn-shaped end of the suction cup is disposed away from the bottom surface of the magnetic levitation base.

\* \* \* \* \*